United States Patent [19]

Yoshino et al.

[11] Patent Number: 5,682,559

[45] Date of Patent: Oct. 28, 1997

[54] CAMERA

[75] Inventors: Hiroshi Yoshino, Osaka; Toshihiko Ishimura, Habikino; Tatsuro Izumi, Hashimoto; Keijiro Tsuchihama, Sakai; Shigeto Ohmori, Kawachinagano, all of Japan

[73] Assignee: Minolta Co., Ltd., Osaka, Japan

[21] Appl. No.: 774,000

[22] Filed: Dec. 26, 1996

Related U.S. Application Data

[63] Continuation of Ser. No. 310,097, Sep. 22, 1994, abandoned.

[30] Foreign Application Priority Data

| Sep. 30, 1993 | [JP] | Japan | 5-245160 |
| Sep. 30, 1993 | [JP] | Japan | 5-245161 |

[51] Int. Cl.⁶ .................................................. G03B 13/36
[52] U.S. Cl. ........................................... 396/121; 396/147
[58] Field of Search ................................ 396/121, 147

[56] References Cited

U.S. PATENT DOCUMENTS

| 4,994,843 | 2/1991 | Kitazawa | 354/409 |
| 5,138,357 | 8/1992 | Utagawa | 354/402 |
| 5,189,466 | 2/1993 | Yasukawa et al. | 354/412 |
| 5,410,383 | 4/1995 | Kusaka et al. | 354/402 |

FOREIGN PATENT DOCUMENTS

| 62-19823 | 1/1987 | Japan . |
| 1-288845 | 11/1989 | Japan . |
| 4-254837 | 9/1992 | Japan . |

OTHER PUBLICATIONS

Kogyo, Syasin, *Technical Report Canon EOS 100 Quartz Date* and *Test Report Canon EOS 100 Quartz Date*, Photographic Industry, vol. 49, No.12, Dec. 1991, pp. 58–78.

Kogyo, Syasin, *Technical Report Nikon F–601* and *Test Report Nikon F–601*, Photographic Industry, vol. 49, No. 2, Feb. 1991, pp. 58–74.

Kogyo, Syasin, *Technical Report Nikon F90* and *Test Report Nikon F90*, Photographic Industry, vol. 50, No. 12, Dec. 1992, pp. 58–79.

*Primary Examiner*—W. B. Perkey
*Attorney, Agent, or Firm*—Burns, Doane, Swecker & Mathis, LLP

[57] ABSTRACT

A camera which includes an operation button which is capable of being depressed, a lever which is rotatably mounted around the operation button, a memory which stores the camera condition which is presently set in response to the rotation of the lever in a predetermined direction, and a circuit arrangement which changes over the camera condition to the condition which is stored in the memory in response to the depression of the operation button. When the lever is rotated, the camera condition presently set is stored in the memory. Thereafter, the stored contents are resumed when the operation button is depressed.

14 Claims, 12 Drawing Sheets

CAMERA

This application is a continuation of application Ser. No. 08/310,097, filed Sep. 22, 1994 now abandoned.

BACKGROUND OF THE INVENTION

1. Field of the Invention

This invention relates to a camera, and more particularly to a camera in which modes and parameters may be set and changed by operating such operating members as dials or levers.

This invention also relates to a camera having a focus detection function, and more particularly to a camera in which focus detection is possible as to multiple areas within the photo-taking area.

This invention also relates to a camera having multiple functions in which the photo-taker my freely select from among these functions before taking the photograph.

2. Description of The Prior Art

Conventionally, cameras having operating members such as dials or levers which may be operated to change modes such as the exposure mode or the light measurement mode, or parameters such as the shutter speed or the aperture value, are well known. In addition, cameras in which in order to reduce the number of operating members a single dial or lever is used for changing among different modes and parameters are also known.

Operating members such as said dials or levers are often located in a position such that they naturally come into contact with the photo-taker's finger when holding the camera, in order to permit easy operation by the photo-taker. As a result, mistaken operation of said members when there is no intention to operate the member can occur, resulting in the unintentional changing of a mode or parameter such that photo-taking cannot take place according to the photo-taker's wishes.

To prevent this type of mistaken operation, cameras including a means to prohibit the setting of a mode or parameter by an operating member, ensuring that the mode or parameter does not change even if the dial or other operating member is operated, currently exist. However, in this case, because the member cannot be operated, if that member is given the function of changing other modes or parameters, those modes or parameters can no longer be changed as well. In other words, functions which are not intended to be prohibited are prohibited nonetheless, and the prohibition must be canceled each time these modes or parameters need to be changed.

Taking the above circumstances into account, an object of this invention is to obtain a construction wherein there is no danger of mistaken operation, and wherein the setting of different modes and parameters is possible.

Additionally, in conventional cameras in which focus detection is possible as to multiple areas within the phototaking area, focus detection is performed by pressing the shutter release button down halfway, whereupon the camera automatically selects the area to be employed for focus adjustment based on the result of that focus detection. Furthermore, cameras that display the area automatically selected at this time are also known.

On the other hand, cameras in which the photo-taker may freely select a focus detection area by choosing one of multiple areas prior to pressing the shutter release button are also known. In addition, cameras that have an operating member which puts the camera in an area selection condition when operated, and in which an area my be selected by means of an operation of another dial, etc. while the area selection condition is present also exist.

In cameras having multiple focus detection areas, when a focus detection area is automatically selected, it is normally unnecessary for the photo-taker to know the area selected. In particular, where the distance between the main photo object and the background is large, or where the depth of field is shallow and the difference between the in-focus condition and the out-of-focus condition is clear, displaying the selected area obstructs the view of the photo object and is a hindrance to photo-taking.

On the other hand, where the distance between the main photo object and the background is small, or where the depth of field is large and the difference between the in-focus condition and the out-of-focus condition is unclear, it is difficult to know which region is in focus, making the photo-taker uncertain. Therefore, in this case, it is preferable to display the area for which focus detection is performed.

However, in the conventional camera, switching between displaying the area and not displaying the area requires that the appropriate mode be set prior to photo-taking. Therefore, when it is desired to confirm the area during photo-taking when the non-display mode is active, it is necessary to stop the photo-taking process and change the mode prior to photo-taking, which is extremely inconvenient.

Therefore, another object of this invention is to obtain a camera having a construction in which a photo-taker wishing to know the automatically selected focus detection area can know the area without having to perform an operation to change the mode each time.

Furthermore, where the distance between the main photo object and the background is small, it is possible that the focus may be adjusted on an area other than the photo object on which the photo-taker wishes to focus. In this case, it is necessary to reselect the area for focus detection.

In addition, the photo-taker may want to change the focus detection area after focus detection has been performed, even in a construction in which the photo-taker may freely select the focus detection area by selecting an area from among multiple areas prior to operating the shutter release button.

However, with a conventional camera, when this occurs, it is necessary for the photo-taker to stop the photo-taking process to cancel the focus detection, re-select a desired focus detection area and begin the photo-taking process once again. Furthermore, to change the area, the photo-taker must first use an operating member to enable area selection and then use a different dial to select an area, which is time-consuming and inconvenient.

Therefore, still another object of this invention is to obtain a camera having a construction in which a photo-taker wishing to perform focusing on an area different from the automatically selected focus detection area or the focus area selected previously may do so without having to perform an operation to change the mode each time.

Conventionally, many cameras having multiple functions have been proposed, and many types have been in use. Moreover, the number of these functions has been increasing in recent years.

In this type of camera having multiple functions, operating members are necessary to perform the functions, and as the types of functions increase the number of operating members must be increased accordingly. Therefore, in a camera having many functions, the number of operating members becomes very large, and it is difficult to know which operating member should be used to achieve the desired function.

Furthermore, since the camera's size is limited, the number of operating members cannot be increased beyond a certain point. In addition, when the number of operating members increases, the cost of assembly increases as well.

On the other hand, among such cameras having multiple functions, cameras in which different functions may be performed by operating two or more members simultaneously have been made available. With this type of construction, although the number of functions may be increased without increasing the number of operating members, since one operating member is responsible for more than one function, it is difficult for the photo-taker to know which function is performed by which member.

Therefore, further object of this invention is to obtain a construction in which a large number of functions may be realized without increasing the number of operating members, as well as in which it is easy to know which operating members are responsible for which functions.

SUMMARY OF THE INVENTION

In order to achieve the above objects, the camera in the invention includes an operation button which is capable of being depressed, a lever which is rotatably mounted around said operation button, a memory which stores the camera condition which is presently set in response to the rotation of said lever in a predetermined direction, and a circuit arrangement which changes over the camera condition to the condition which is stored in said memory in response to the depression of said operation button.

In order to achieve the above objects, the camera in the invention includes an information input device, an operation member which is manually operated to direct a kind of information which is set by said information input device, and a circuit arrangement which alters the camera condition between a first condition in which the information setting by said information input device is allowed and a second condition in which the information setting by said input device is inhibited, said circuit arrangement inhibits the information setting when the information input device is solely operated and allows the information setting when the information input device is operated together with said operation member under said second condition.

Furthermore, the present invention includes a focus detector which detects the focusing condition of the camera concerning a plurality of areas in a photographing range, a first circuit arrangement which initiates the focus detection by said focus detector responsive to a manual operation, a second circuit arrangement which automatically selects the area utilized for the focus detection, a display portion in which the areas can be displayed, a manual operation member, and a focusing control circuit which controls said focus detector to detect the focusing condition of the area which is automatically selected by said second circuit arrangement when the focus detection is initiated by the first circuit arrangement, while said focusing control circuit controls said focus detector to detect the focusing condition of the area which is automatically selected by said second circuit arrangement and controls said display portion to display the selected area when the manual operation member is operated in a condition where the focus detection is initiated by the first circuit arrangement.

Furthermore, the present invention includes a focus detector which detects the focusing condition of the camera concerning a plurality of areas in a photographing range, a first circuit arrangement which initiates the focus detection by said focus detector responsive to a manual operation, a second circuit arrangement which automatically selects the area utilized for the focus detection, a display portion in which the areas can be displayed, a focusing control circuit which controls said focus detector to detect the focusing condition of the area which is automatically selected by said second circuit arrangement and controls said display portion to display the selected area when the focus detection is initiated by the first circuit arrangement, a manual operation member which is operated so as to select the area, and a third circuit arrangement which selects the area utilized for the focus detection in response to the operation of said manual operation member in a condition where the display device displays the area due to the initiation by said first circuit arrangement.

Furthermore, the present invention includes a focus detector which detects the focusing condition of the camera concerning a plurality of areas in a photographing range, a manual operation member, a first circuit arrangement which initiates the focus detection by said focus detector when said manual operation member is operated in a first condition, and a second circuit arrangement which selects the area which is utilized for the focus detection by said focus detector when said manual operation member is operated in a second condition.

Furthermore, the present invention includes a focus detector which detects the focusing condition of the camera concerning a plurality of areas in a photographing range, a focusing device which operates so as to obtain an in focus condition in response to the focus detection of said focus detector, a manual operation member, a first circuit arrangement which inhibits the focusing device from being operated when said manual operation member is operated in a first condition, and a second circuit arrangement which selects the area which is utilized for the focus detection by said focus detector when said manual operation member is operated in a second condition.

Furthermore, the present invention includes a focus detector which detects the focusing condition of the camera concerning a plurality of areas in a photographing range, a focusing device which operates so as to obtain an in focus condition in response to the focus detection of said focus detector, a manual operation member, a first circuit arrangement which inhibits the focusing device from being operated when said manual operation member is operated, a second manual operation member, and a second circuit arrangement which alters the area which is utilized for the focus detection by said focus detector in response to the operation of said second manual operation member under a condition where the focusing device is inhibited from being operated by said first circuit arrangement.

Furthermore, the present invention includes a light measuring device which measures the object illuminance, an exposure calculation circuit which calculates an exposure value in dependence on the object illuminance measured by said light measuring device, an automatic exposure device which carries out an exposure, a first manual operation member, an exposure correction device which shifts the exposure value calculated by said exposure calculation circuit in response to the operation of said first manual operation member, a flash light control circuit which controls the amount of flash light, a second manual operation member, a flash control circuit which controls the flash operation in response to the operation of said second manual operation member, and a flash light control correction circuit which shifts the light amount controlled by said flash light control circuit when both the first and the second manual operation members are operated simultaneously.

Furthermore, the present invention includes a light measuring device which measures the object illuminance, an exposure calculation circuit which calculates an exposure value in dependence on the object illuminance measuredly said light measuring device, a first manual operation member, an exposure correction device which shifts the exposure value calculated by said exposure calculation circuit in response to the operation of said first manual operation member, a second manual operation member, an exposure device which carries out photographing in response to the operation of said second manual operation member, and an automatic bracket device which carries out a bracket photographing in which the exposure value is automatically varied in a series of photographing when both the first and the second manual operation members are operated simultaneously.

Furthermore, the present invention includes a first manual operation member, a reset circuit which resets the camera condition to a predetermined initial condition in response to the operation of said first manual operation member, a second manual operation member, a memory which stores the camera condition in response to the operation of said second manual operation member, a third manual operation member, and a change over circuit which changes over the camera condition based on the stored contents of said memory in response to the operation of said third manual operation member.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE EMBODIMENTS

An embodiment of the present invention is explained in detail below with reference to the drawings.

FIG. 5 is an external view of an embodiment of a camera in which the present invention is applied, and shows an oblique rear view of the camera.

Figure 5A:
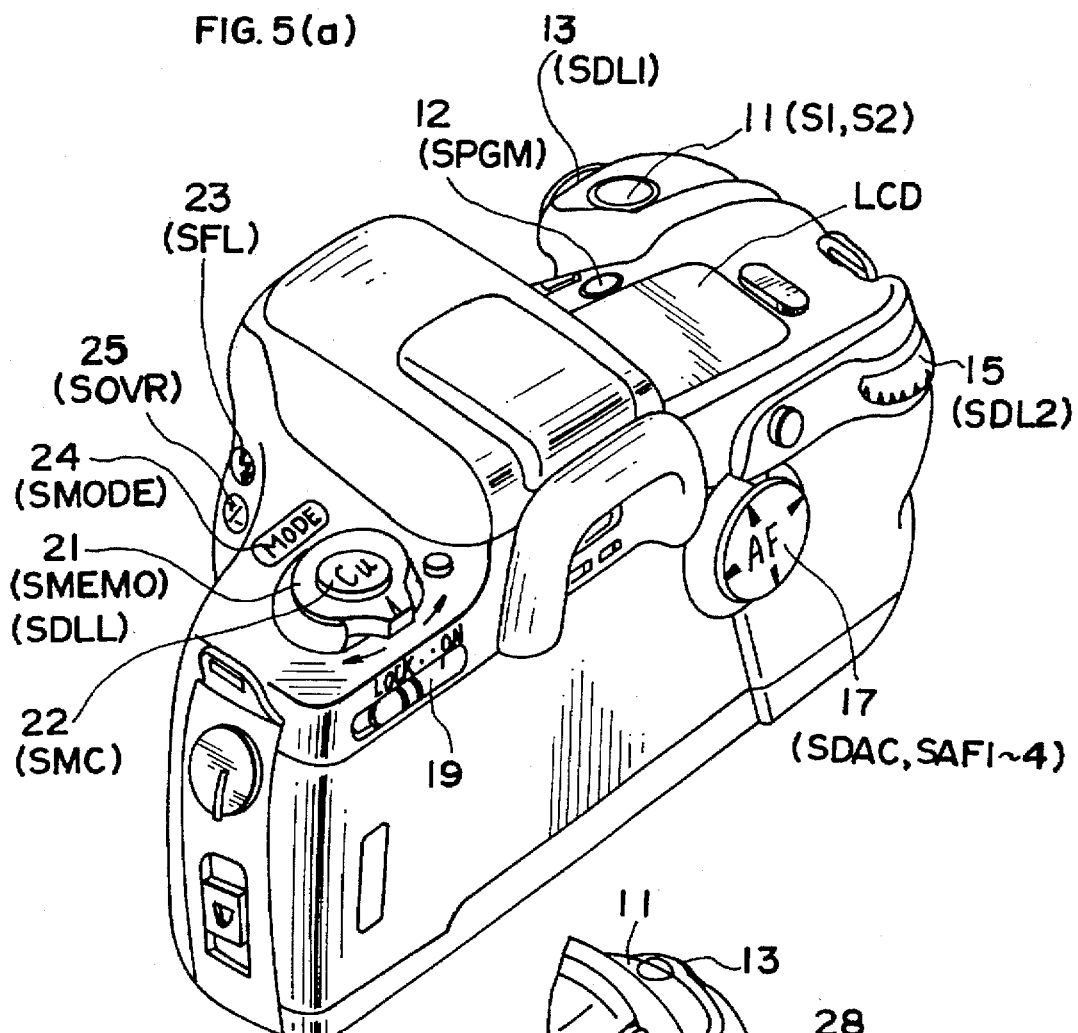
FIG. 5 is an external view of the camera of said embodiment.

In FIG. 5(a), shutter release button 11 is located on the right side of the pentagonal roof prism, and dials 13 and 15 are rotatably located at the front and back of the shutter release button, respectively. The functions of these two dials vary depending on the set mode, but because these functions do not pertain to the essential nature of the present invention, their explanation is omitted.

Furthermore, an LCD display constructed of liquid crystal is located between shutter release button 11 and rear dial 15. Program reset button 12 is located in front of the LCD display. Moreover, round switch 17 having multiple functions pertaining to the autofocus (hereafter 'AF') mechanism is located to the side of rear dial 15 at a position where it may be operated by the photo-taker's thumb when holding the camera. This switch can perform both a push switch function when it is pressed in the center and a cursor function when it is pressed on the top, bottom, right or left edges.

On the other hand, main switch 19 for turning on the power is located on the left side of the pentagonal roof prism. Switch lever 21 which is rotatable to a prescribed degree is located in front of main switch 19, and the camera's settings maybe stored in memory by rotating this switch lever 21 in a clockwise direction. This function will be described in detail below. Furthermore, when this switch lever 21 is rotated in a counterclockwise direction, mode and parameter setting by means of dials 13 and 15 may be prohibited. This function will also be described in detail below. Moreover, custom button 22 is located at the position of the rotational axis of this switch lever 21, and when this custom button 22 is pressed, the information stored by means of switch lever 21 is retrieved.

Furthermore, mode button 24 for changing the exposure mode is located in front of said switch lever 21. To change the exposure mode, this mode button 24 is pressed while dial 13 or 15 is rotated. Forced light emission button 23 for forced operation of an electronic flash and exposure correction button 25 for performing exposure correction are located in front of said mode button 24 and beside the mounting unit that is used for attaching an exchangeable lens.

Figure 5B:
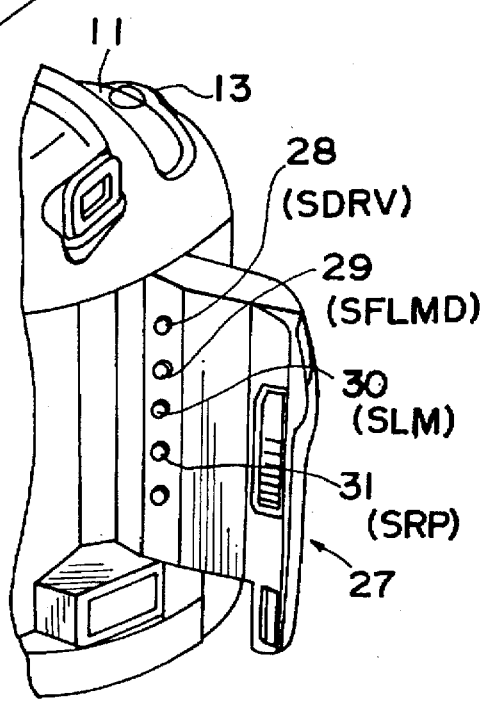

Furthermore, as shown in FIG. 5(b), the part that forms a camera grip (the part held by the right hand) is constructed of door 27 that can open and close, and multiple push buttons are located inside said door 27.

The push buttons inside door 27 are, in sequential order from the top, drive mode setting button 28, flash mode setting button 29, light measurement mode setting button 30, and AF mode setting button 31.

Figure 1:
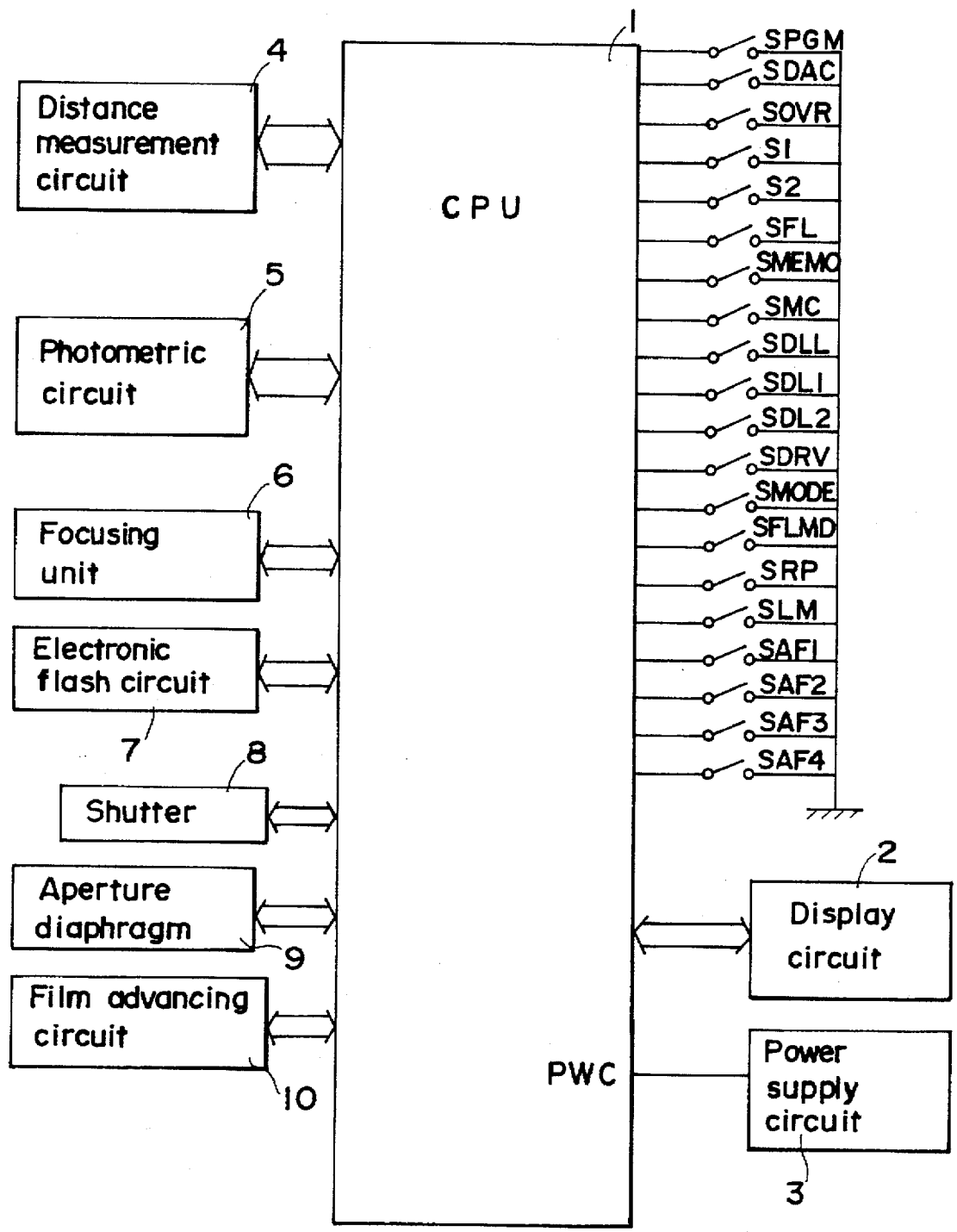
FIG. 1 is a block diagram of a circuit of one embodiment of the present invention.

FIG. 1 is a block diagram of the embodiment of the camera. 1 is a microcomputer (hereafter abbreviated as 'CPU') that controls the entire camera. Said CPU has, in addition to a normal operation mode, a sleep mode in which operation of the CPU is stopped and the amount of power consumed is greatly reduced (e.g., where such consumption is 10 mA in normal operation mode, it is 10 μA in sleep mode). The return to normal operation mode from sleep mode is accomplished through the occurrence of an interrupt. These interrupts include a timer interrupt based on a timer within the CPU itself and a key-on wake up interrupt that occurs when the CPU terminal comes to have low potential (this condition is hereafter termed 'L').

Furthermore, the internal status of this CPU may be maintained even where the voltage of the power source is reduced to an amount lower than the voltage for normal operation (e.g., where the voltage for normal operation is 5V, even where the voltage is reduced to 3V).

2 is a display circuit that displays such things as the shutter speed (hereafter termed 'TV'), aperture value (hereafter termed 'AV'), focus detection area, light measurement area (multiple areas/center weighted/spot), exposure mode (P or program mode/A or aperture priority mode/S or shutter speed priority mode/M or manual mode), exposure correction value, TTL light adjustment correction value of the electronic flash (hereafter termed 'light adjustment correction value'), flash mode (preliminary light emission for reducing the 'red-eye' phenomenon/automatic light emission/forced light emission/wireless flash mode), drive mode (single-frame photo-taking/continuous photo-taking/silent photo-taking/multiple exposure photo-taking/bracket photo-taking), and AF mode (AF priority/shutter release priority) in the LCD display in the camera body or in the viewfinder (not shown in the drawings).

3 is a power circuit that is connected to the CPU through a PWC terminal and sends power and changes voltage to each circuit based on the control by the CPU.

4 is a focus detection circuit for performing detection for autofocusing, and has a sensor with multiple focus detection areas. Focus detection is performed in a mode in which one among multiple focus detection areas is used, or in a mode in which the most appropriate area is automatically chosen based on the results from detection using the multiple areas. 6 is a focusing unit that controls the AF lens drive based on the result of focus detection.

5 is a photometric circuit that performs light measurement to determine the amount of exposure. 7 is an electronic flash circuit that carries out the charging of the capacitor and controls light emission. 8 is a shutter. 9 is an aperture control circuit that controls the lens aperture. 10 is an advancing circuit that advances the film and cocks a shutter mechanism.

Next, the various types of switches will be explained.

SPGM returns the settings of the camera to the standard operating condition, and operates when said program reset button 12 is pressed.

SDAC is an AF switch that operates when round switch 17 is pressed in the center. When it is pressed in the exact center, one-shot AF is activated, where focus adjustment is fixed after in-focus condition is obtained, and the focus detection area automatically selected by the camera is displayed. SAF1, SAF2, SAF3 and SAF4 operate when the top, bottom, right or left edge of said round switch 17 is pressed, and perform the function of selecting the focus detection area. In other words, where the photo-taker desires to perform focusing on an area other than the area displayed (i.e., the automatically selected area), when round switch 17 is pressed in the direction in which focusing is desired, that area is displayed, and focus detection and focus drive are performed once again. In addition, when switch SDAC is turned OFF, the condition in which an area is selected by switches SAF1 to SAF4 becomes fixed, and focus detection is performed the next time using this area. To return to automatic selection, round switch 17 is again pressed in the center to reactivate switch SDAC. These functions will be explained in detail below.

S1 is a light measurement/AF commencement switch, and S2 is a release switch. Switch S1 operates by pressing down said shutter release button 11 halfway, while switch S2 operates when said shutter release button 11 is pressed down completely. SOVR is an exposure correction switch that changes the exposure correction value when it is operated by means of said exposure correction button 25. In addition, SOVR performs auto-bracket functioning when used in combination with said switches S1 and S2. SFL is a forced light emission switch that performs forced light emission in automatic flash light emission mode when said forced light emission button 23 is pressed. Furthermore, SFL performs the function of changing the light adjustment correction value when used in combination with switch SOVR. SMEMO is a switch that enters the settings of the camera body into memory via the operation of said switch lever 21 in a clockwise direction, and SMC is a switch that calls up the contents of the memory via the operation of said custom button 22. SDLL is a dial lock switch that makes dials 13 and 15 inoperable via the operation of said switch lever 21 in a counterclockwise direction, and SDL1 and SDL2 are switches that detect the rotation of said dials 13 and 15. SMEMO, SMC and SDLL will be described in detail below.

SDRV is a switch that changes the drive mode setting via the operation of said drive mode setting button 28, and the mode alternates among single-frame photo-taking and continuous photo-taking, etc., each time button 28 is pressed. SMODE is a switch that changes the exposure mode setting, and operates when dial 13 or dial 15 is turned while mode button 24 is pressed, which causes the exposure mode to change in rotational sequence. SFLMD is a switch that changes the flash mode setting via the operation of flash mode setting button 29, and each time button 29 is pressed, the mode setting alternates in rotational sequence among preliminary light emission mode to reduce the red-eye phenomenon, automatic light emission mode, light emission prohibition mode, wireless flash mode, etc. In addition, SRP alternates the AF mode between AF priority mode and release priority mode via the operation of AF mode setting button 31. Furthermore, SLM is a switch that changes the light measurement mode setting via the operation of light measurement mode setting button 30.

Because these operating switches are connected to CPU terminals that generate key-on wake up interrupts, the CPU is activated when any of the switches is operated.

Figure 2:
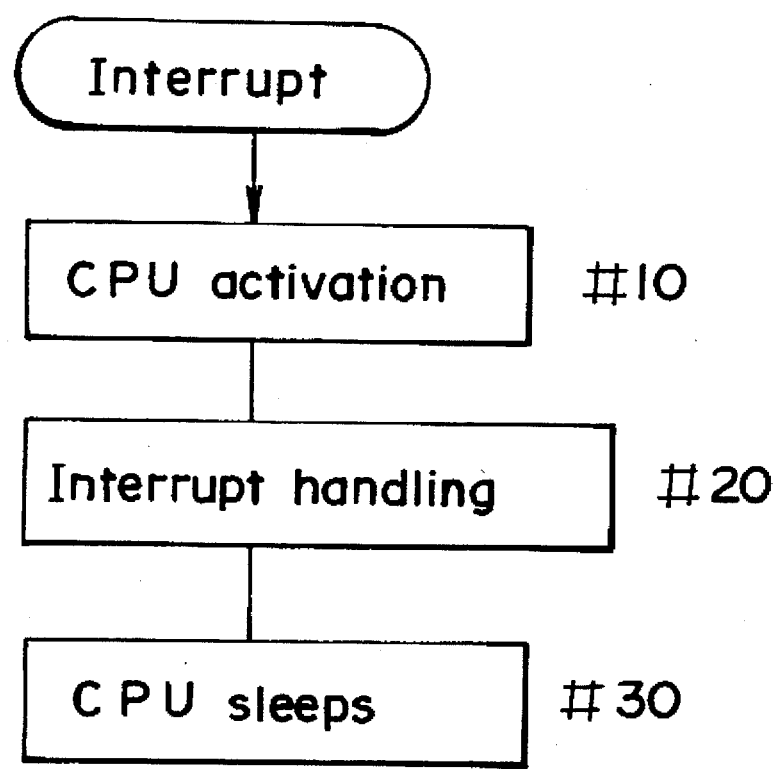
FIG. 2 is a flow chart showing the basic operational sequence of said embodiment.

FIG. 2 is a flow chart showing the camera's basic operational sequence. When an interrupt is generated while the CPU is in sleep mode, the CPU is activated (Step #10). As the CPU's operating mode is switched from sleep mode to normal operating mode, the PWC terminal of the power circuit is set to a high potential level (hereafter termed 'H'). When the PWC terminal of the power circuit becomes H, the output voltage is changed from 3V to 5V, and electricity is supplied to the entire camera.

Next, in Step #20, the process for handling the interrupt is performed. When the handling is completed, the procedure of Step #10 is performed in reverse in Step #30, i.e., while the CPU is switched from normal operation mode to sleep mode, the PWC terminal of the power circuit is set to L. When the PWC terminal of the power circuit becomes L, the output voltage is changed from 5V to 3V, and electricity is cut off from the entire camera except for the CPU and display circuit. In this state, the CPU is inactive, and the consumption of power is greatly reduced since the supply of power to unnecessary circuits has been cut off and the voltage supplied to the CPU is switched to a low voltage. Because the display circuit can operate even on low voltage, and consumes little power, the displays discussed above can still be displayed.

Next, the process after the interrupt performed in Step #20 will be discussed.

Figure 3:
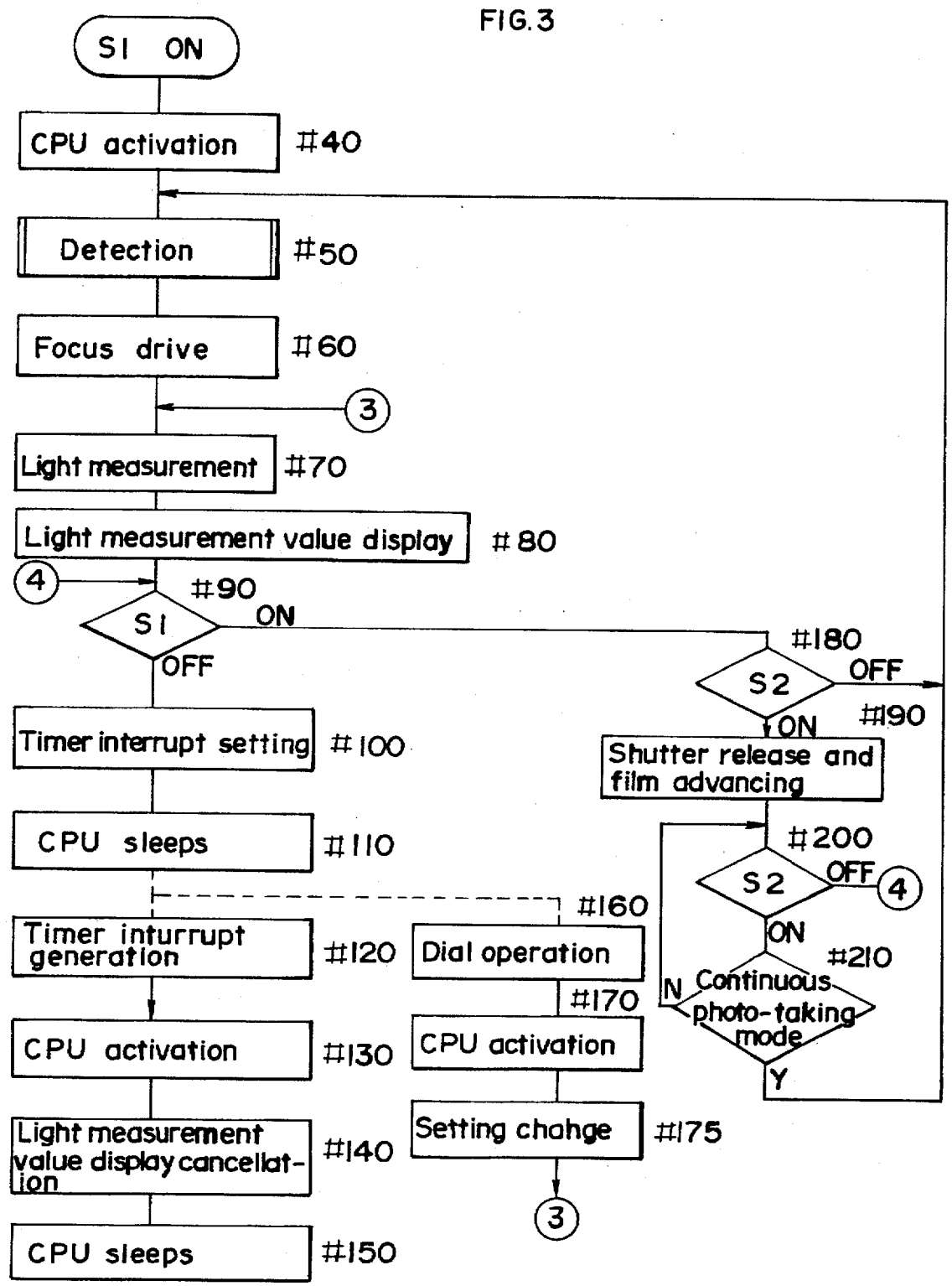
FIG. 3 is a flow chart showing the operational sequence when the shutter release switch is operated in said embodiment.

FIG. 3 shows the sequence of events after switch S1 is turned ON. When switch S1 is turned ON, the CPU is activated in Step #40 (which is identical to Step #10), and focus detection is performed (Step #50). Based on the result thereof, focus drive is performed (Step #60) and light measurement is subsequently performed. Exposure calculation is performed from the obtained brightness, and TV and AV are calculated (Step #70). The results are then displayed via the display circuit (Step #80).

In Step #90, the status of switch S1 is determined, and if switch S1 is OFF, the CPU enters sleep mode with the light measurement value continuing to be displayed. When this happens, a timer interrupt is set (Step #100) in order to cancel the light measurement value after a prescribed period of time has elapsed, and in Step #110 the CPU switches to sleep mode (which is identical to Step #30). When this happens, the light measurement value continues to be displayed.

Subsequently, if nothing is operated for a prescribed period of time, an interrupt is generated (Step #120) and the CPU is activated (Step #130). At this time, since nothing has been operated, the CPU determines that the camera is no longer being operated and cancels the display of the light measurement value (Step #140). When the above process is completed, the CPU once again enters sleep mode (Step #150).

If dial 13 or dial 15 is operated while the CPU is in sleep mode after Step #110, a key-on wake up interrupt is generated and the CPU is activated (Step #160). When this happens, the settings are changed in response to the operation of the dials (Step #175), and the routine proceeds to Step #70. However, if dial lock switch SDLL is ON and only dial 13 or dial 15 is operated, the settings do not change.

For example, where dial 13 or dial 15 is operated in S or M mode and the CPU is activated while dial lock switch SDLL is turned ON, the TV setting does not change in spite of the operation of the dial, and in A or M mode, the AV setting does not change. Furthermore, in P mode, the program chart is prohibited from changing. However, when dial 13 or dial 15 is operated at the same time as another switch, the change is permitted. For example, if exposure mode switch SMODE is ON when the CPU is activated due to the operation of dial 13 or dial 15, the exposure mode may be changed even if dial lock switch SDLL is ON.

This point is explained in detail with reference to FIG. 12.

Figure 12:
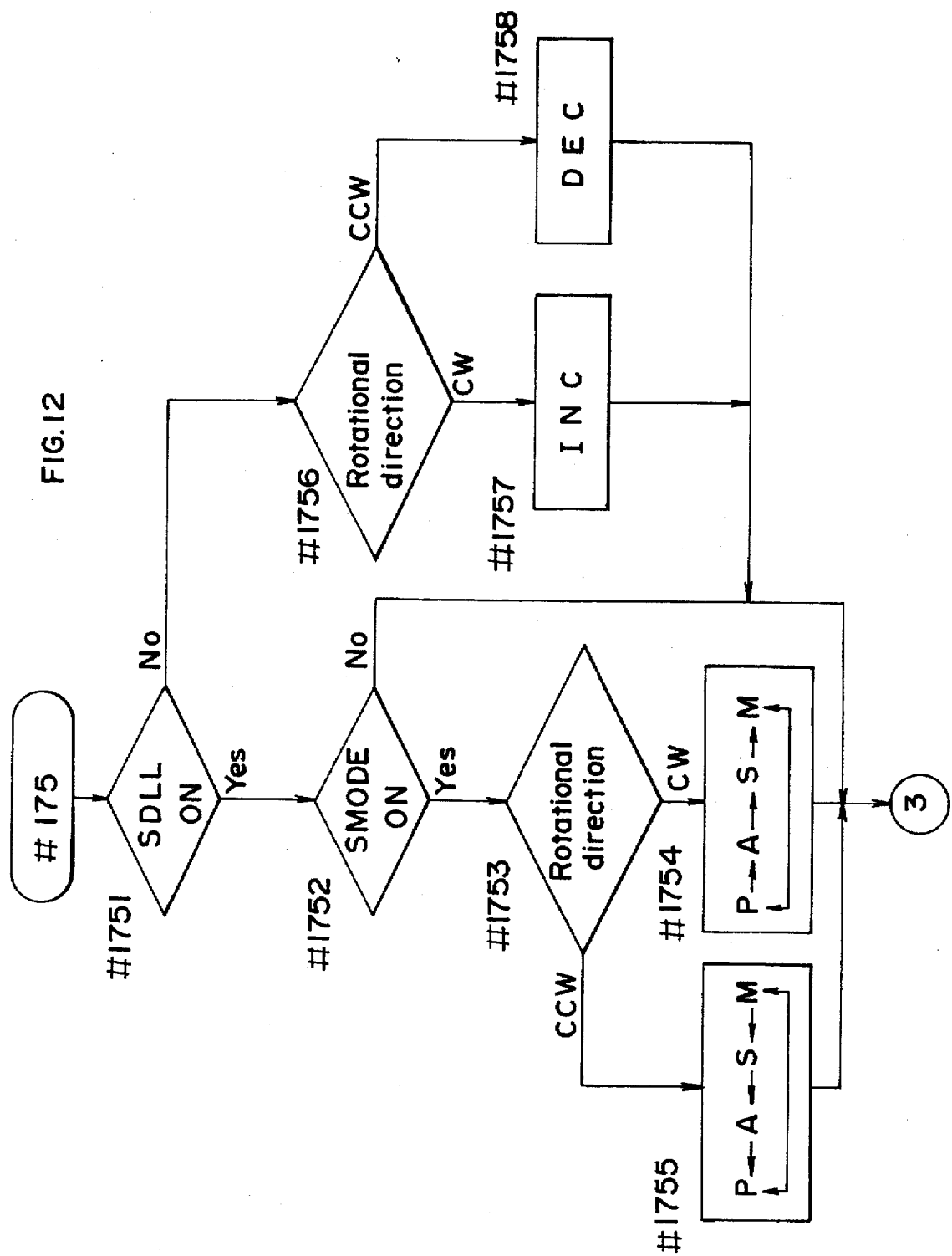
FIG. 12 is a flow chart showing the operational sequence when the dial lock is in place in said embodiment.

One example of the process of said Step #175 is shown in detail in FIG. 12. This operation is performed when switch SDL1 or switch SDL2 is operated via the operation of dial 13 or dial 15.

First, it is determined in Step #1751 whether or not dial lock switch SDLL is ON. If it is not ON, the parameters are changed in accordance with the dial's rotational direction. In other words, the dial's rotational direction is determined in Step #1756 from the status of switches SDL1 or SDL2, the routine proceeds to Step #1757 or Step #1758, and the shutter speed, aperture value or both are increased or reduced in accordance with the set exposure mode. The routine then moves to Step #70.

On the other hand, if it is determined in Step #1751 that dial lock switch SDLL is ON, it is determined in Step #1752 whether or not exposure mode switch SMODE is ON. Then, if switch SMODE is not ON, the routine jumps to Step #70 without any changes being made.

However, if it is determined in Step #1752 that exposure mode switch SMODE is ON, because this means that mode button 24 and dial 13 or 15 were operated simultaneously, the routine proceeds to Steps #1753, #1754 and #1755, and the exposure mode setting is changed. In other words, the exposure mode is changed in the sequence of P→A→S→M or M→S→A→P in response to the rotational direction of the dial. The routine then jumps to Step #70.

Incidentally, in the present embodiment, because dials 13 and 15 are also used when the exposure mode is changed, the status of exposure mode switch SMODE is determined in step #1752. It is also acceptable if the status of other switches is determined when the dials are used for other settings. For example, where the construction is such that in order to change the drive mode the photo-taker rotates the dials while pressing drive mode setting button 28, the status of switch SDRV may be determined in a step equivalent to Step #1752: if it is ON, the drive mode may be changed, while if it is OFF, the routine may jump to Step #70 without any change being made.

Returning to FIG. 3, if it is determined in said Step #90 that switch S1 is ON, the routine advances to Step #180 where switch S2 is checked. If switch S2 is OFF, the routine returns to Step #50, and the operations of Step #50 to Step #80 are repeated until switch S1 becomes OFF or switch S2 becomes ON. If switch S2 is ON, shutter release and subsequent film advancing are performed in Step #190. Then the status of switch S2 is checked once more (Step #200), and if switch S2 is OFF, the routine advances to Step #90 and light and distance measurement for the next shutter release are performed. If switch S2 is ON, and continuous photo-taking mode is selected (Step #210), the routine proceeds to Step #50, and focus detection and light measurement for the next shutter release are performed. If the camera is not in continuous photo-taking mode, the routine returns to Step #200 and waits until switch S2 becomes OFF.

Figure 6:
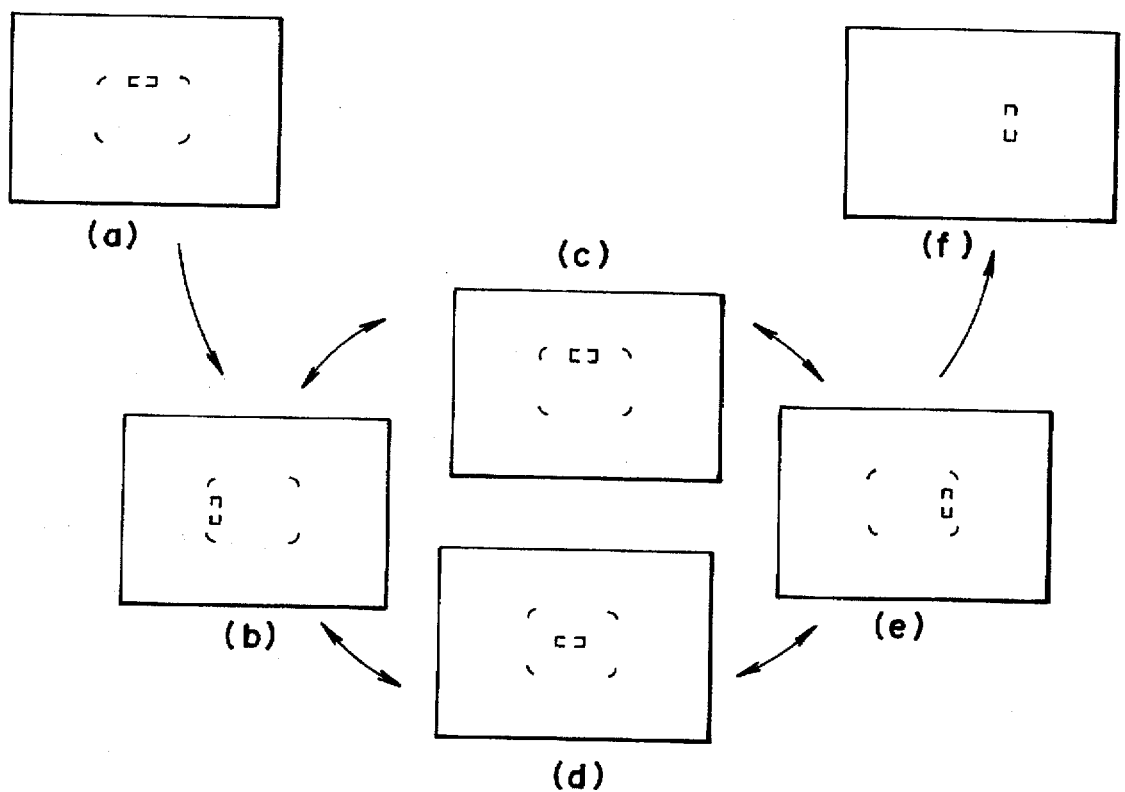
FIG. 6 is a drawing showing the finder display in said embodiment.

Next, the round switch shown in FIG. 5, that is, switches SDAC, SAF1, SAF2, SAF3 and SAF4 in FIG. 1, will be explained with reference to FIGS. 4, 6 and 7.

Figure 4:
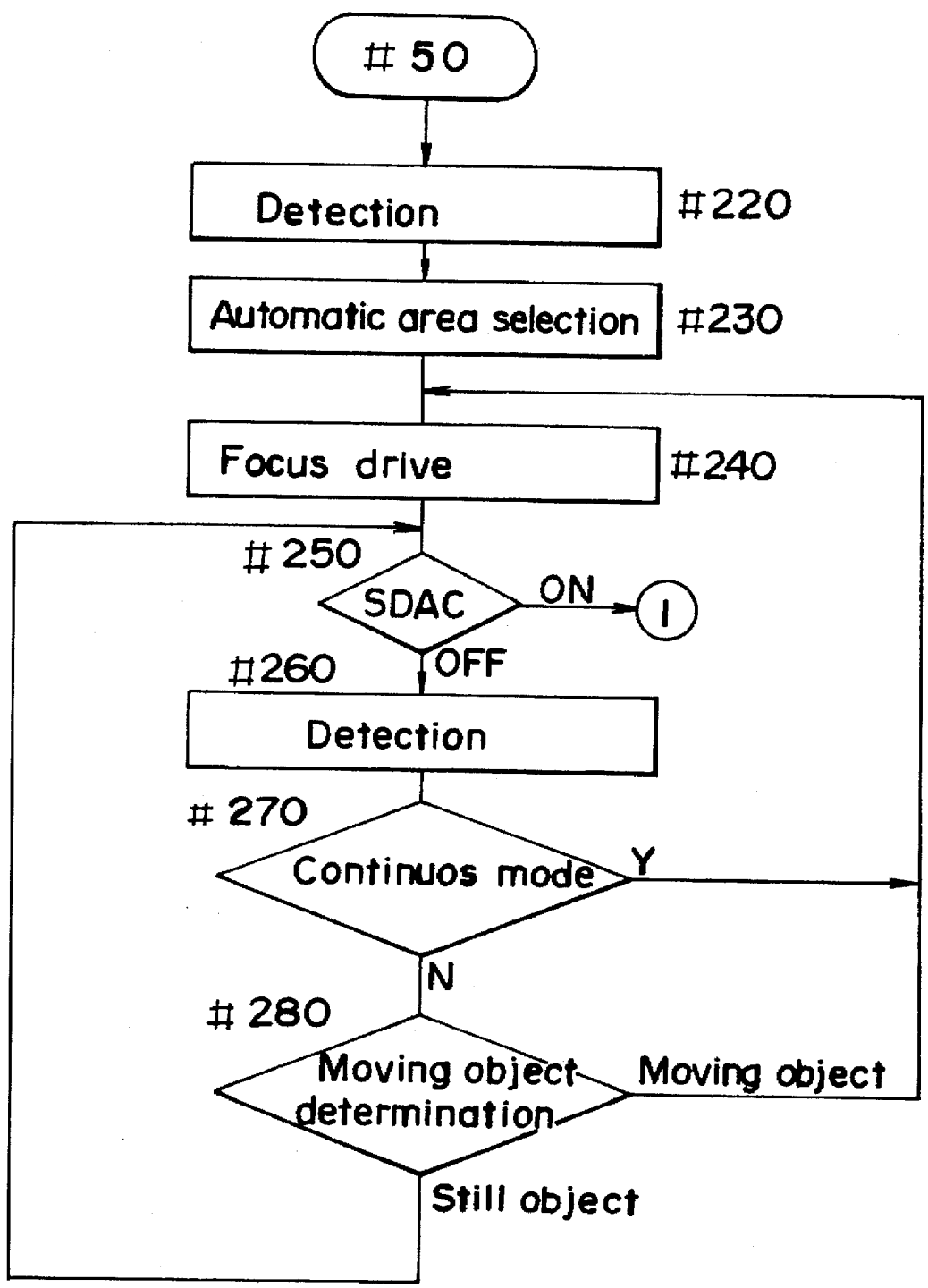
FIG. 4 is a flow chart showing the operational sequence of the AF mechanism in said embodiment.

First, FIG. 4 shows the details of Step #50 shown in FIG. 3.

In FIG. 4, first, focus detection is performed in Step #220, the most appropriate focus target is selected from among multiple focus detection areas, and the focus drive amount is then obtained (Step #230). Then, focus drive is performed in Step #240 in accordance with this amount. Next, the status of switch SDAC is determined in Step #250, and if it is ON, the routine proceeds to Step #320 as shown in FIG. 7 and described below. If switch SDAC is OFF, the same operations as in said Steps #220 and #230 are performed in Step #260, and the routine then proceeds to Step #270.

In Step #270, it is determined whether or not the camera is in continuous mode in which focus detection is performed continuously. Then, if it is in continuous mode, the routine proceeds to Step #240 and focus drive is performed once again. If it is not in continuous mode, the routine proceeds to Step #280 where it is determined whether the photo object is moving (moving object) or not moving (still object). If it is a moving object, the routine proceeds to Step #240 and focus drive which keeps pace with the photo object is performed. If in Step #280 it is determined to be a still object, the routine returns to Step #250 and focus detection is performed once more.

Next, the process when switch SDAC is operated and when it is determined in Step #250 of FIG. 4 that switch SDAC is ON is explained with reference to FIG. 7.

When switch SDAC is turned ON, focus detection is performed in Step #290, and in Steps #290 to #310 the most appropriate focus detection area is automatically selected and focus drive is performed (this is identical to Steps #220 to #240). Focus detection is then performed again in Step #320, and if the result shows that the camera is in focus ('Y' in Step #330), the camera displays the automatically selected detection area (Step #340) as shown in FIG. 6(a).

Next, it is determined whether or not the detection area for performing focus detection has been changed. A change in the detection area my be determined by detecting whether or not any of switches SAF1 to SAF4 has been operated. In other words, if it is determined in Step #350 that switch SDAC has stayed ON and it is determined in Step #360 that a detection area change operation has not been performed (none of switches SAF1 to SAF4 has been operated), focus drive is not performed until switch SDAC is turned OFF (OFF in Step #350).

If it is determined in Step #360 that a detection area change operation has been performed (any of switches SAF1 to SAF4 has been operated), the focus detection area is changed in accordance with that change (Step #370) and the focus detection area after the change is displayed as shown in FIG. 6(b) to 6(e). Detection is then performed once again using the selected area (Step #380), and the routine then returns to Step #310 where focus drive is performed once more. The steps following and including Step #320 are subsequently repeated.

Figure 7:
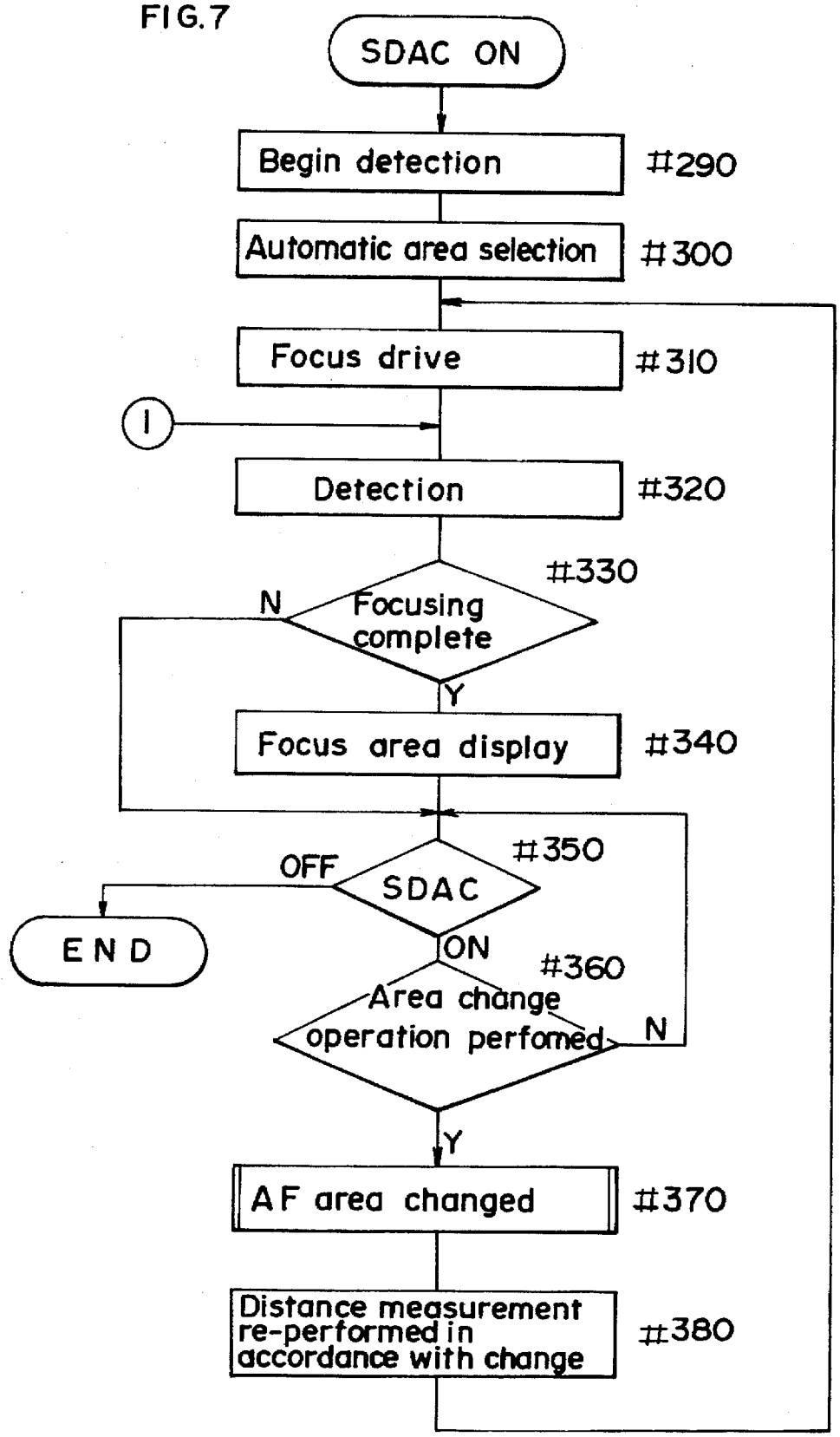
FIG. 7 is a flow chart showing the operational sequence when functions in connection with the AF mechanism are performed in said embodiment.

The routine shown in FIG. 7 ends when it is detected in Step #350 that switch SDAC is OFF. Then, if switch SDAC is turned OFF without a change in the focus detection area occurring, area selection is maintained at automatic selection, and if it occurs after a change in the focus detection area, the next focus detection is performed using the area selected via the carrying out of the detection area change operation.

On the other hand, when this routine is entered from Step #250 of the sequence shown in FIG. 4, i.e., when switch SDAC is operated while switch S1 is ON, the routine is entered from Step #320.

Figure 8:
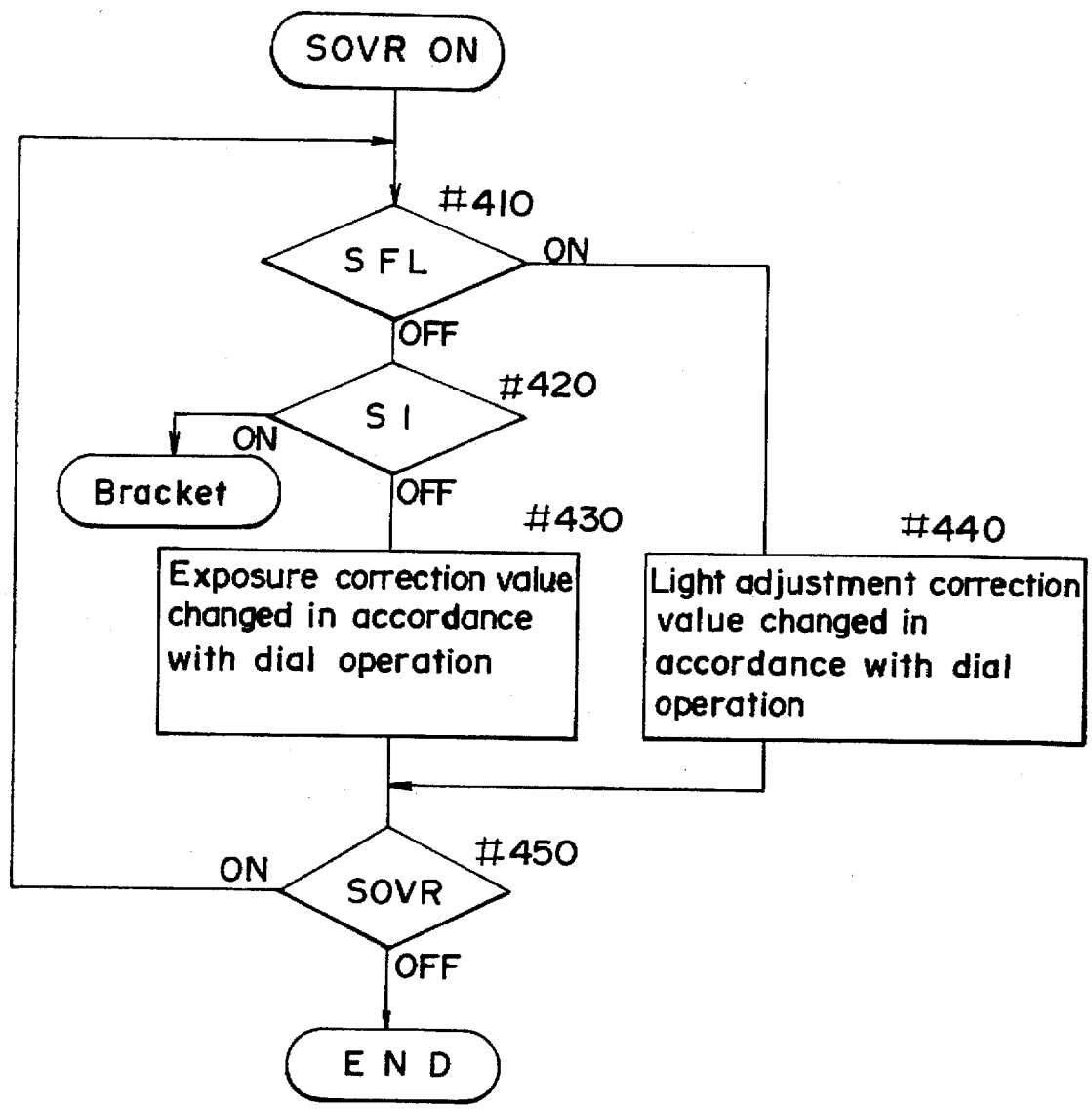
FIG. 8 is a flow chart showing the operational sequence when exposure correction is performed in said embodiment.

Next, the process when switch SOVR is operated will be explained with reference to FIG. 8 and FIG. 9.

When switch SOVR is turned ON, the status of switch SFL and switch S1 is checked in Steps #410 and #420, respectively, and since an exposure correction instruction is given if only switch SOVR is ON, the exposure correction value is changed in Step #430 in accordance with the operation of the dials.

If switches SOVR and SFL are ON at the same time, ('ON' in Step #410), since it means that an instruction for flash photo-taking exposure correction, i.e., flash light adjustment value correction, is given, the automatic light adjustment amount correction value is changed in Step #440 in accordance with the operation of the dials.

Incidentally, although the construction here is such that when switch SFL is operated at the same time as switch SOVR, the camera enters the mode wherein the automatic flash light adjustment amount is corrected, this may also be made to occur in connection with switch SFLMD, instead of switch SFL. That is, it is acceptable as long as that switch pertains to the operation of the electronic flash.

Figure 9:
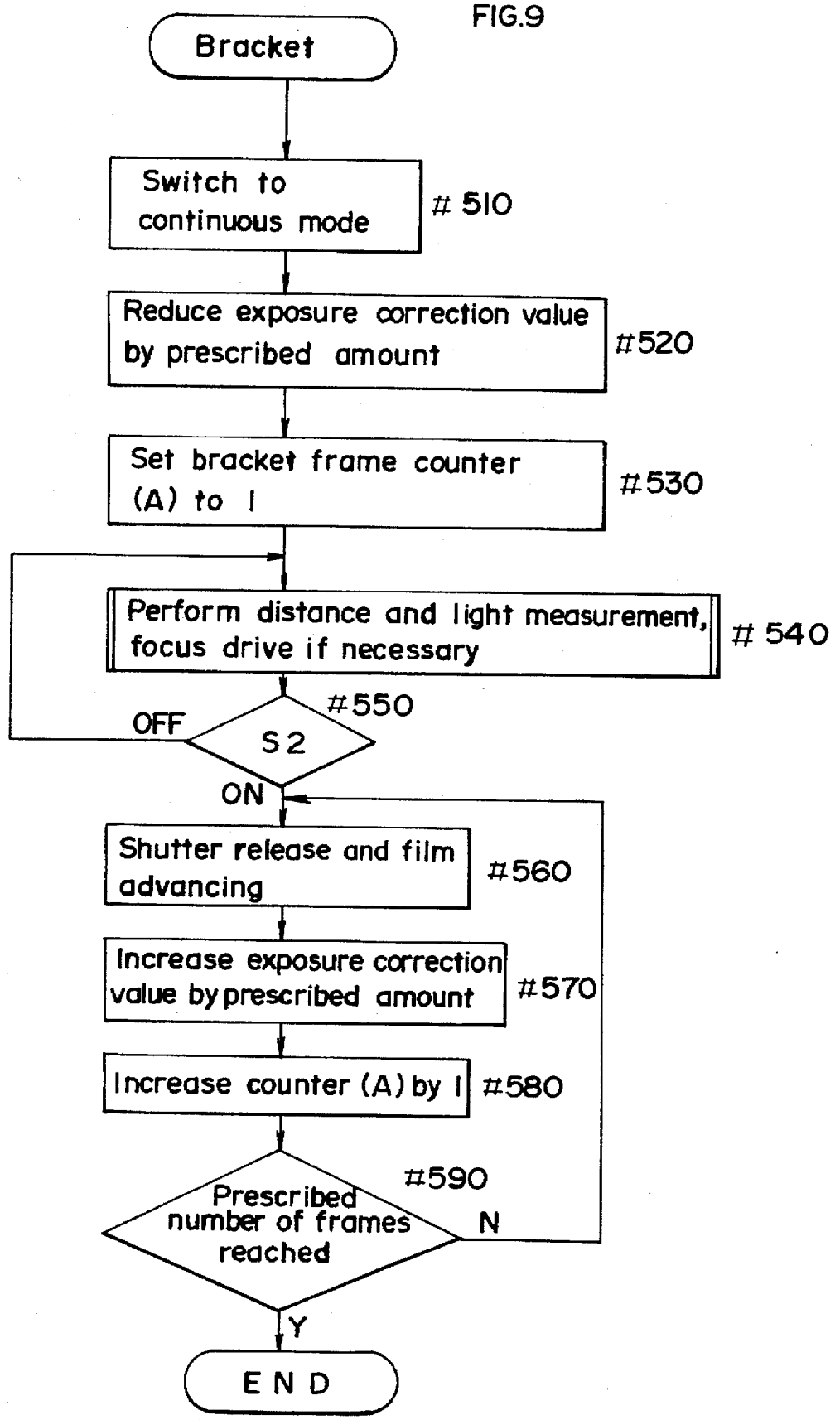
FIG. 9 is a flow chart showing the operational sequence when auto-bracket photo-taking is performed in said embodiment.

Furthermore, if switches SOVR and S1 are simultaneously ON ('OFF' in Step #410, 'ON' in Step #420), since it means that photo-taking is carried out while exposure correction is performed, i.e., auto-bracket photo-taking is instructed, the process advances to the sequence shown in FIG. 9 and bracket mode photo-taking is performed.

Bracket mode photo-taking is sequential photo-taking in which, for example, when the taking of three photographs is instructed to be performed in steps of 0.5 Ev, shifted photo-taking, with exposure values that are 0.5 Ev under the correct value, equal to the correct value and 0.5 over the correct value, is performed in sequential order.

In FIG. 9, first, in Step #510 the camera switches to continuous photo-taking mode, an exposure value for initial photo-taking is established by reducing the exposure correction value by a prescribed amount (Step #520), and counter (A) for counting the number of bracket photos is set to 1 (Step #530). Light measurement, focus detection and focus drive are then performed to the extent necessary (Step #540). It is then determined in Step #550 whether or not switch S2 is ON, and if it is OFF, Steps #540 and 550 are repeated.

If switch S2 becomes ON in Step #550, shutter release and film advancing are performed (Step #560), the exposure correction value is increased for the next shutter release by an increment of one step (Step #570), and counter (A) is increased by a value of one (Step #580). In Step #590 it is determined whether photo-taking for the number of photos designated has been completed, and Steps #560 to #590 are repeated until completion. In other words, continuous photo-taking is performed while the exposure value is increased by a one-step increment.

If it is determined in Step #590 that photo-taking for the number of photos designated has been completed, bracket photo-taking is terminated.

Figure 10:
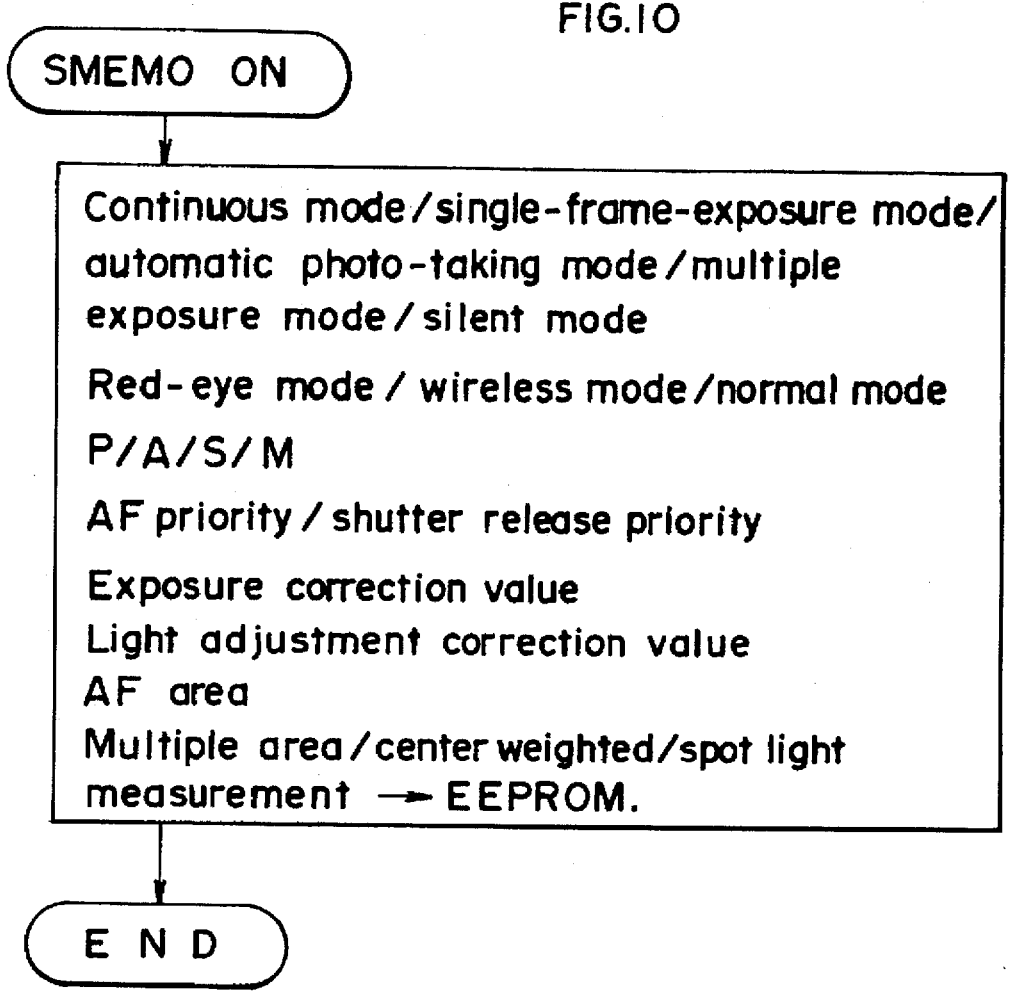
FIG. 10 is a flow chart showing the operational sequence of the memory function in said embodiment.
Figure 11:
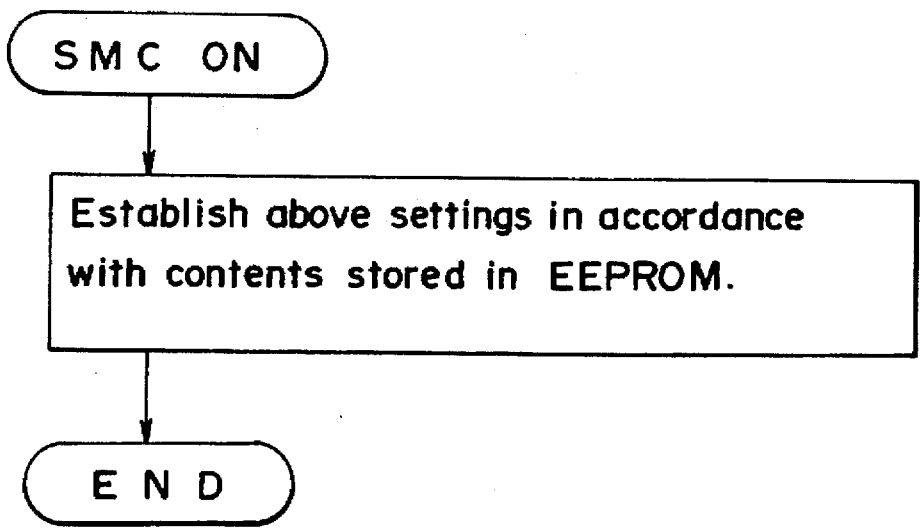
FIG. 11 is a flow chart showing the operational sequence when the contents of the memory are called up in said embodiment.

FIG. 10 shows the process when switch SMEMO is operated. When switch SMEMO is operated, among various settings of the camera, all of those displayed by the display circuit described above are stored in a prescribed memory area of the EEPROM. The information stored in the memory at this time is, as shown in FIG. 11, called up when switch SMC is operated, at which time the camera settings are changed to the values .stored in the EEPROM.

Figure 13:
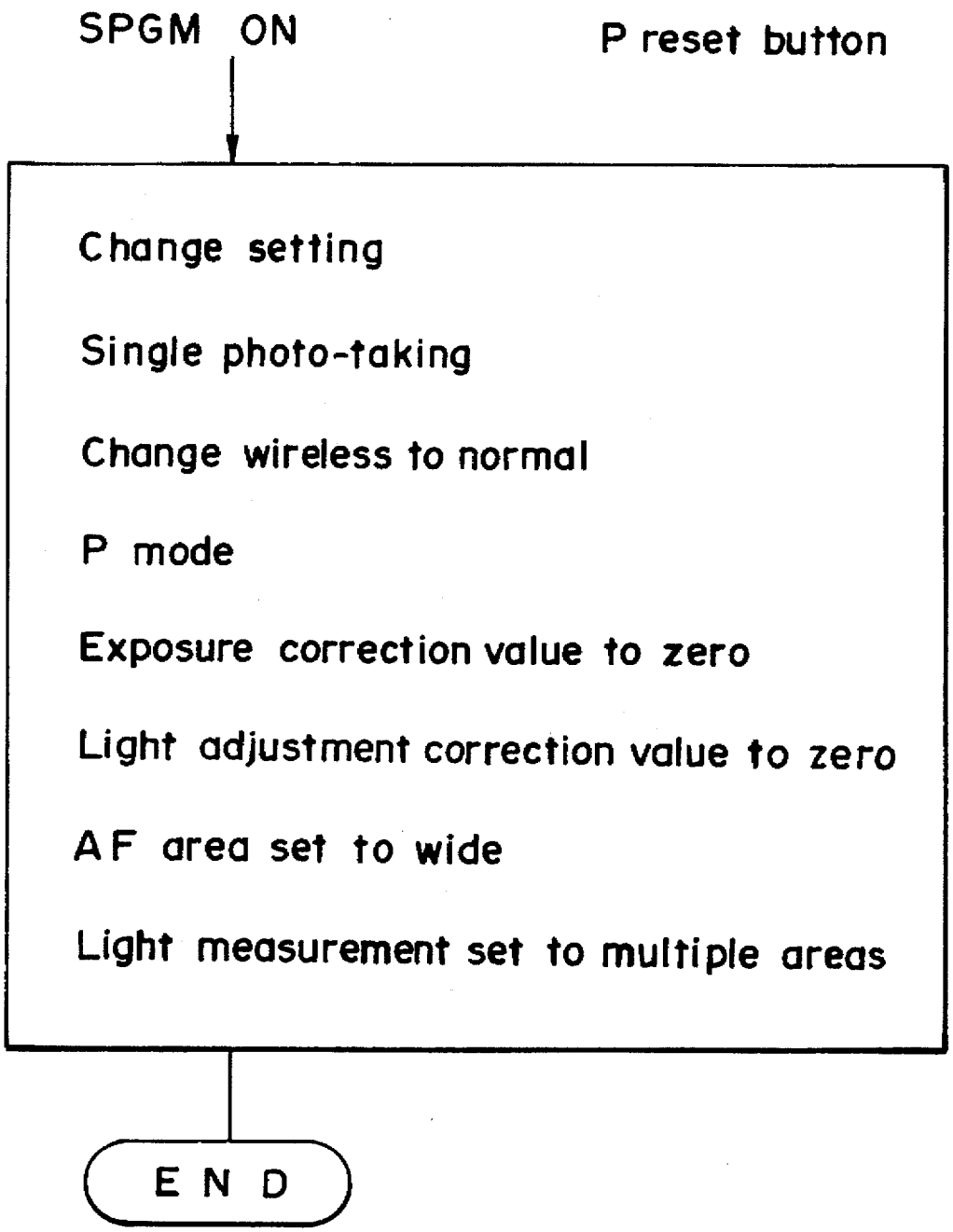
FIG. 13 is a flow chart showing the operational sequence when the program reset function is performed in said embodiment.

FIG. 13 shows the process when switch SPGM is operated. When this switch is operated, the camera enters a special status regardless of the camera's settings at the time.

In other words, the camera returns to single-frame photo-taking even where it is in continuous photo-taking mode, as shown in the drawing, wireless flash mode is canceled even if it is active, the exposure mode returns to program mode even if shutter speed priority mode, aperture priority mode or manual mode is active, exposure correction is set to zero (no correction) even if a different value was previously set, flash light adjustment value correction is set to zero (no correction) even if a different value was previously set, the camera is set to automatically select an appropriate value from the results of detection with regard to multiple detection areas even if it was previously set to select a specific area for autofocusing, and the camera is set to automatically select an appropriate value from the results of detection with regard to multiple detection areas even if it was previously set to select a specific area for light measurement.

Although the present invention has been fully described in connection with the preferred embodiments thereof with reference to the accompanying drawings, it is to be noted that various changes and modifications are apparent to those skill in the art. Such changes and modifications are to be understood as included within the scope of the present invention as defined by the appended claims unless they depart therefrom.

What is claimed is:

1. A camera comprising:
   a focus detector which detects the focusing condition of the camera for a plurality of areas in a photographing range;
   a first circuit which initiates the focus detection by said focus detector responsive to a manual operation;
   a second circuit which automatically selects the area utilized for the focus detection;
   a display portion in which the areas can be displayed;
   a manual operation member; and
   a focusing control circuit which controls said focus detector to detect the focusing condition of the area which is automatically selected by said second circuit and which inhibits said display portion from displaying the area selected by said second circuit when the focus detection is initiated by the first circuit, while said focusing control circuit controls said focus detector to detect the focusing condition of area which is automatically selected by said second circuit and controls said display portion to display the selected area when the manual operation member is operated in a condition where the focus detection has been initiated by the first circuit.

2. A camera as claimed in claim 1, further comprising:
   a second manual operation member which is operated so as to select the area; and
   a third circuit which selects the area which is utilized for the focus detection when said second manual operation member is operated in a condition where the display is carried out by the operation of the first manual operation member.

3. A camera comprising:
   a focus detector which detects the focusing condition of the camera for a plurality of areas in a photographing range;
   a first circuit which initiates the focus detection by said focus detector responsive to a manual operation;
   a second circuit which automatically selects the area utilized for the focus detection;
   a display portion in which the areas can be displayed;
   a manual operation member;
   a focusing control circuit which controls said focus detector to detect the focusing condition of the area which is automatically selected by said second circuit and control said display portion to display the selected area when the focus detection has been initiated by the first circuit;
   a manual operation member which is operated so as to select the area; and
   a third circuit which selects the area utilized for the focus detection in response to the operation of said manual operation member irrespective to the result of automatic selection by said second circuit in a condition where the display portion displays the area due to the initiation by said first circuit.

4. A camera comprising:
   a focus detector which detects the focusing condition of the camera for a plurality of areas in a photographing range;
   a manual operation member;
   a shutter release button which is operated by manual operation to initiate an exposure and which is separate from said manual operation member;
   a first circuit which initiates the focus detection by said focus detector when said manual operation member is operated in a first condition; and
   a second circuit which selects the area which is utilized for the focus detection by said focus detector when said manual operation member is operated in a second condition.

5. A camera as claimed in claim 4, wherein a focusing operation is started after the focus detection is initiated by said first circuit and the focusing operation is inhibited after an infocus condition is obtained.

6. A camera as claimed in claim 4, wherein said manual operation member is capable of being depressed and the depression position distinguishes the first and the second conditions.

7. A camera as claimed in claim 6, wherein the center position of said manual operation member is depressed for the first condition and the peripheral position is depressed for the second condition.

8. A camera comprising:
   a focus detector which detects the focusing condition of the camera for a plurality of areas in a photographing range;
   a focusing device which operates so as to obtain an in focus condition in response to the focus detection of said focus detector;
   a manual operation member;
   a first circuit which inhibits the focusing device from being operated when said manual operation member is operated in a first condition; and
   a second circuit which selects the area which is utilized for the focus detection by said focus detector when said manual operation member is operated in a second condition.

9. A camera as claimed in claim 8, wherein said manual operation member is capable of being depressed and the depression position distinguishes the first and the second conditions.

10. A camera as claimed in claim 9, wherein the center position of said manual operation member is depressed for the first condition and the peripheral position is depressed for the second condition.

11. A camera comprising:
    a focus detector which detects the focusing condition of the camera for a plurality of areas in a photographing range;
    a focusing device which operates so as to obtain an in focus condition in response to the focus detection of said focus detector;
    a manual operation member;
    a first circuit which inhibits the focusing device from being operated when said manual operation member is operated;
    a second manual operation member; and
    a second circuit which alters the area which is utilized for the focus detection by said focus detector in response to the operation of said second manual operation member under a condition where the focusing device is inhibited from being operated by said first circuit.

12. A camera as claimed in claim 11, wherein said focus detector initiates its detection in response to the alteration by said second circuit arrangement.

13. A camera comprising:

a focus detector which detects the focusing condition of the camera for a plurality of areas in a photographing range;

a manual operation member;

a first circuit which automatically selects the area which is utilized for the focus detection based on the focusing condition detected by said detector when said manual operation member is operated in a first condition; and a second circuit which selects the area which is utilized for the focus detection based on the operation of said manual operation member when said manual operation member is operated in a second condition.

14. A camera comprising:

a focus detector which detects the focusing condition of the camera for a plurality of areas in a photographing range;

a focusing device which operates so as to obtain an in-focus condition in response to the focus detection of said focus detector;

a first manual operation member;

a first circuit which, when said first manual operation member is operated, initiates the focus detection by said focus detector and inhibits said focusing device from being operated after an in-focus condition is obtained;

a second manual operation member; and a second circuit which changes the area which is utilized for the focus detection in response to the operation of said second manual operation member during a condition in which said first circuit inhibits said focusing device from being operated.

* * * * *